L. ESPENSCHIED.
RADIOFREQUENCY INTERFERENCE BALANCE.
APPLICATION FILED OCT. 23, 1916.

1,309,400.

Patented July 8, 1919.
2 SHEETS—SHEET 1.

INVENTOR
L. Espenschied
BY Thomas D. Lockwood
ATTORNEY

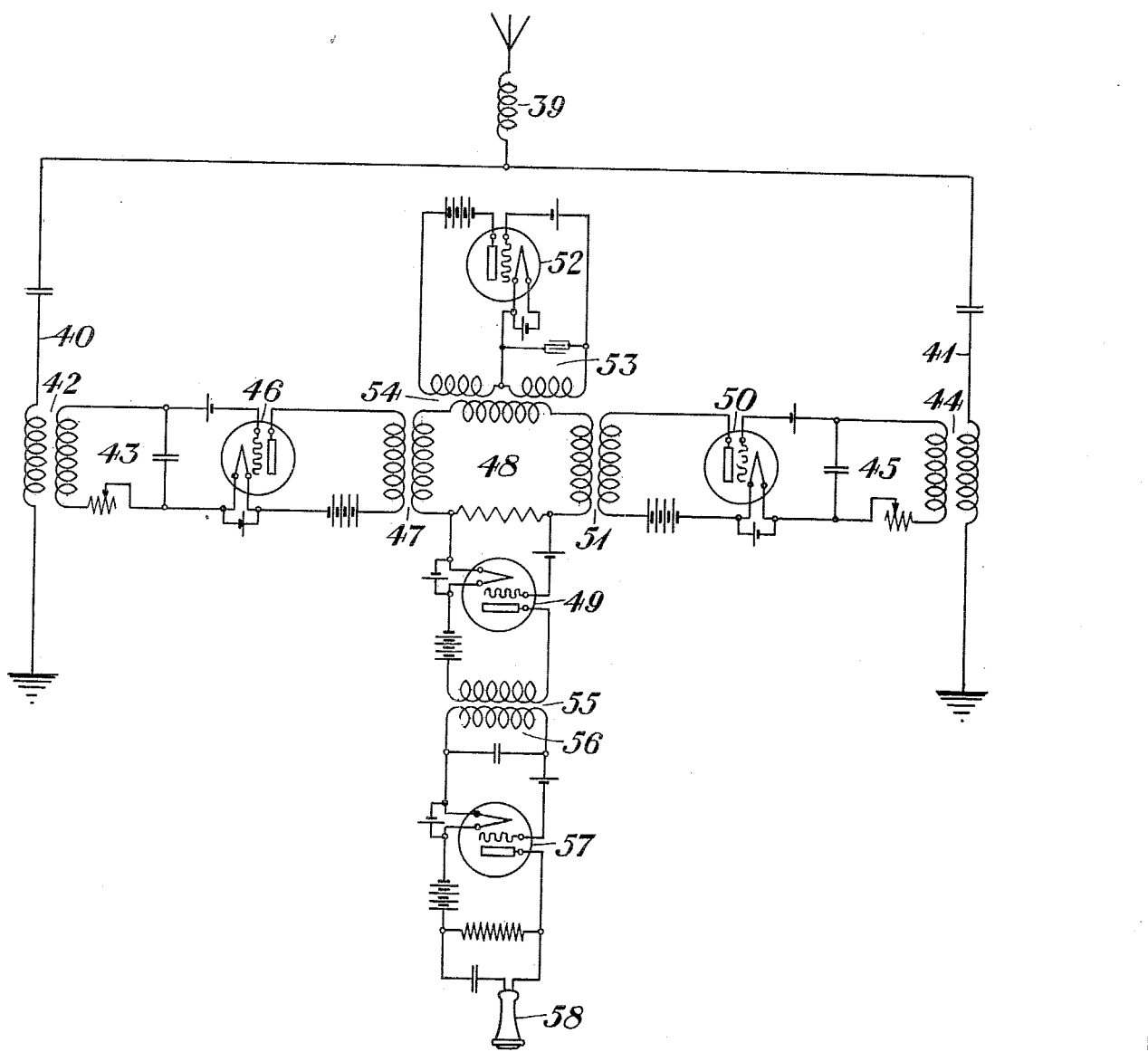

UNITED STATES PATENT OFFICE.

LLOYD ESPENSCHIED, OF HOLLIS, NEW YORK, ASSIGNOR TO AMERICAN TELEPHONE AND TELEGRAPH COMPANY, A CORPORATION OF NEW YORK.

RADIOFREQUENCY INTERFERENCE-BALANCE.

1,309,400.  Specification of Letters Patent.  Patented July 8, 1919.

Application filed October 23, 1916. Serial No. 127,170.

*To all whom it may concern:*

Be it known that I, LLOYD ESPENSCHIED, residing at Villard avenue, Hollis, Long Island, in the county of Queens and State of New York, have invented certain Improvements in Radiofrequency Interference-Balance, of which the following is a specification.

This invention relates to a wireless receiving system and more particularly it relates to means for protecting the receiving device associated with said system from interference such as that due to static or natural atmospheric disturbances. Its object is to provide a receiving system which is free from interference, particularly that due to static disturbance, and at the same time efficient in the reception of continuous waves of the frequency to which said system is tuned.

The effect of static disturbances on a wireless receiving system may be likened to that of a blow upon a tuning fork; characteristic damped oscillations of the natural frequency of the system are set up therein and these can not be tuned out as can persistent or sustained oscillations of a definite periodicity from a foreign station. In the present invention no attempt is made to tune out the interference known as "static" but an auxiliary system is provided whose function is, in coöperation with the receiving system, to balance out or neutralize static disturbances with respect to the receiving device. The auxiliary system is tuned to a frequency differing from that to which the receiving system is tuned and is therefore unresponsive to the continuous waves it is desired to receive. The natural oscillations excited by static disturbances in the receiving and auxiliary systems are therefore of different frequencies. For this reason a frequency converting device is provided to convert the frequency of the oscillations in the auxiliary system to equality with that of the oscillations in the receiving system and differentially combine the resultant oscillations with respect to the receiving device. A further feature of the invention consists in providing an auxiliary system whose characteristic damping factor is the same as that of the receiving system.

Figure 1:
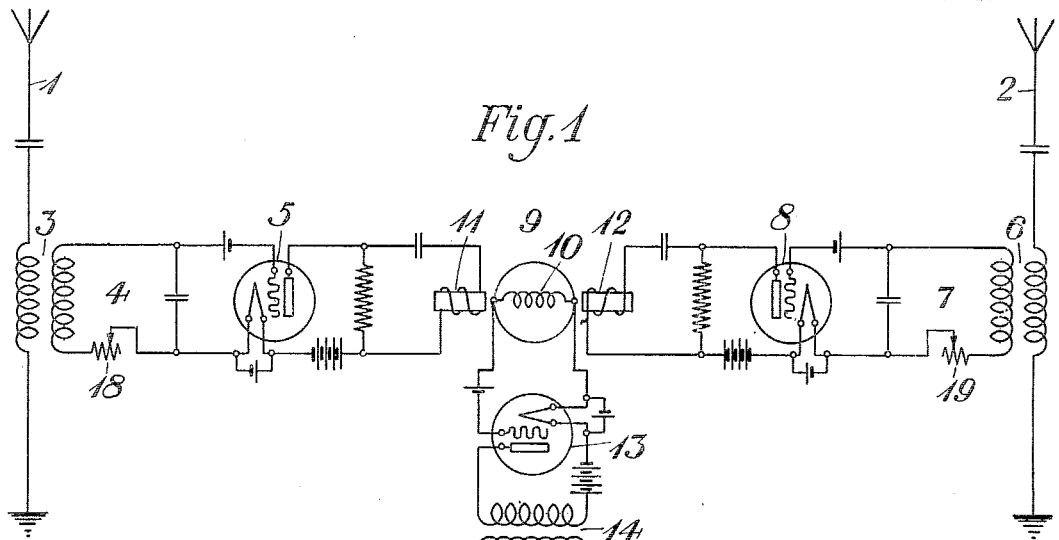
Figure 2:
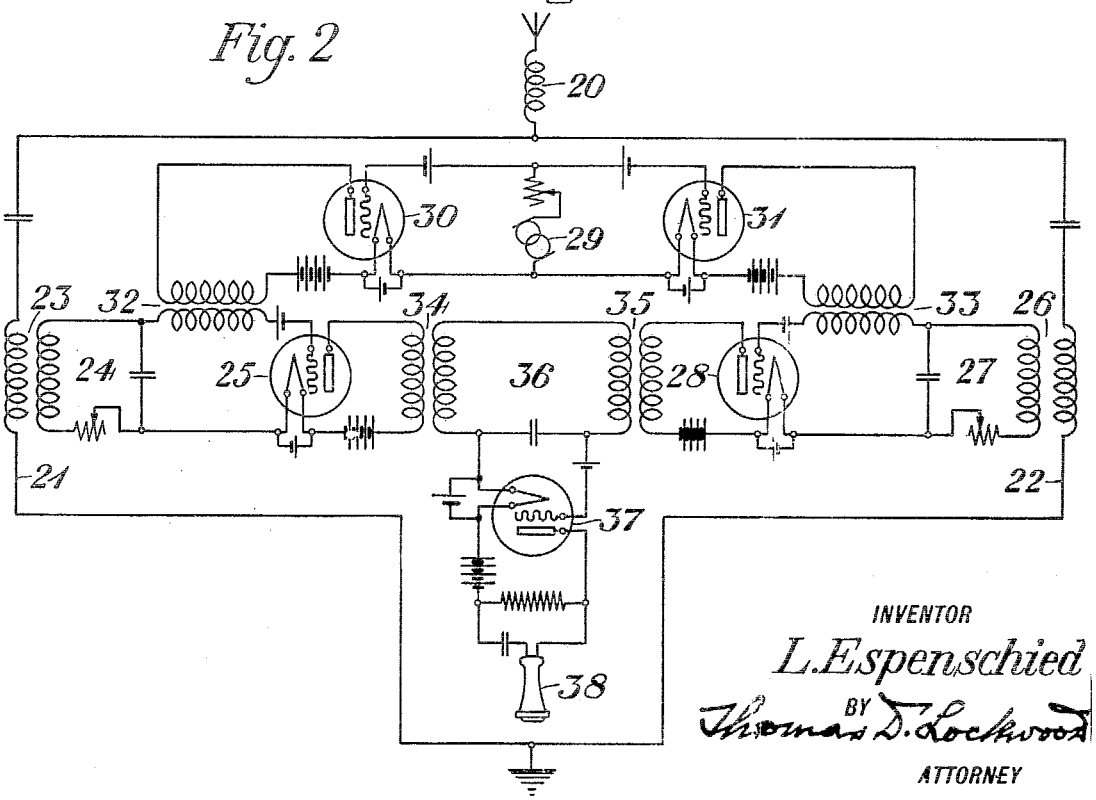

The invention is best understood by reference to the accompanying drawings in which Figures 1, 2 and 3 are diagrams illustrative of three forms of wireless receiving systems embodying the invention.

Referring to Fig. 1, a pair of receiving antennæ 1 and 2 are provided, antenna 1 being tuned to the receiving frequency and antenna 2 being tuned to a frequency differing sufficiently therefrom to render it substantially unresponsive to the receiving frequency. Coupled to antenna 1 by a transformer 3 is an oscillation circuit 4 tuned to the receiving frequency and working into the input side of a vacuum tube amplifier 5 of well known construction. Similarly antenna 2 is coupled by means of transformer 6 to oscillation circuit 7 tuned to the same frequency as antenna 2 and working into the input side of amplifier 8. A frequency transformer 9 of the general type disclosed in U. S. patent to Goldschmidt 999,987 issued August 8, 1911, is provided, said transformer comprising a rotor winding 10 and stationary or field windings 11 and 12, winding 11 being included in the output circuit of amplifier 5 while winding 12 is included in the output circuit of amplifier 8. The rotor winding 10 is connected to the input side of a modulator 13 whose output circuit works through a transformer 14 into an oscillation circuit 15 connected to the input side of a vacuum tube detector 16 in the output circuit of which is a receiving instrument 17.

The frequency transformer 9 above referred to is so constructed that its rotor winding 10 may be rotated at a speed such as to give an alternating frequency $n$. If, then, a frequency $N$ be impressed upon its stationary winding 11, it may be shown that two frequencies $N+n$ and $N-n$ will appear in the rotor circuit, while if a frequency $N_1$ be impressed on winding 12, frequencies $N_1+n$ and $N_1-n$ will appear in the rotor circuit.

Suppose a static disturbance affects antennæ 1 and 2 and that these antennæ are resonant to frequencies $N$ and $N_1$ respectively. Antenna 1 will oscillate at frequency $N$ and impress oscillations of the same frequency upon oscillation circuit 4, said oscillations being amplified by the amplifier 5 and impressed in the field winding 11. At the same time antenna 2 oscillates at frequency $N_1$ and impresses a frequency $N_1$ upon the oscillation circuit 7, said oscillations being amplified by amplifier 8 and impressed upon the field winding 12. If, now, the rotor 10 be rotated at an alternating frequency $n$ so chosen as to be equal to $\frac{1}{2}(N-N_1)$ three frequencies will appear in the output circuit, viz: $N+n$, $N-n=N_1+n$, and $N_1-n$. These frequencies are amplified by the amplifier 13 and impressed upon oscillation circuit 15 which is tuned to frequency $N-n=N_1+n$, so that this frequency is brought out and frequencies $N+n$ and $N_1-n$ suppressed. The circuits may be so adjusted that the oscillations from antennæ 1 and 2 are impressed upon windings 11 and 12 in such manner as to appear in the rotor circuit in opposite phase relation, while by suitable adjustment of amplifiers 5 and 8 they may be given the same amplitude, and by means of variable resistances 18 and 19 the same decrement. Being converted to the same frequency $N-n=N_1+n$ by the frequency transformer 9, it is obvious that the two sets of oscillations will then neutralize each other, and that no oscillations will appear in the oscillation circuit 15, and no effect will be produced on the detector 16 or receiving instrument 17. If, however, signals of a frequency $N$ are received the antenna 2 is substantially unaffected, while antenna 1 being resonant to this frequency, impresses said frequency through amplifier 5 upon field winding 11. As a result frequencies $N+n$ and $N-n$ appear in the rotor circuit and are amplified by amplifier 13. Oscillation circuit 15 suppresses the frequency $N+n$ while frequency $N-n$ is impressed on the detector and causes a signal in receiving instrument 17.

It is obvious of course that the rotor circuit may be tuned to the desired frequency $N-n=N_1+n$ so that the undesired frequencies $N+n$ and $N_1-n$ are suppressed before amplification by amplifier 13 in which case the oscillation circuit 15 would be unnecessary. It will further be noted that by the provision of resistances 18 and 19, the auxiliary circuits, including antenna 2 and associated circuit, may be adjusted so as to have the same damping factor as the receiving circuits, so that static disturbances produce oscillations of the same damping in both sets of circuits.

Another embodiment of the invention is illustrated in Fig. 2 in which an antenna 20 is provided having two branches 21 and 22, branch 21 being resonant to receiving frequency $N$ and branch 22 being resonant to a different frequency $N_1$. Branch 21 is coupled through a transformer 23 to an oscillation circuit 24 tuned to frequency $N$ and connected to the input side of a vacuum tube modulator 25. Similarly branch 22 is coupled through transformer 26 to oscillation circuit 27 tuned to frequency $N_1$ and working into the input side of vacuum tube modulator 28. A generator 29 of frequency $n$ is connected to the input side of vacuum tubes 30 and 31 whose output circuits are connected through transformers 32 and 33 to the input circuits of modulators 25 and 28 respectively. Vacuum tubes 30 and 31 prevent any reaction from the input of the modulators back into the generator 29. The output circuits of modulators 25 and 28 work through transformers 34 and 35 into an oscillation circuit 36 tuned to frequency $N-n=N_1+n$, said circuit being connected to the input circuit of a detector 37 in the output circuit of which is a receiving instrument 38.

When a static disturbance occurs antenna branches 21 and 22 resonate at frequencies $N$ and $N_1$ respectively so that a frequency $N$ is impressed on the modulator 25 from oscillation circuit 24 and a frequency $n$ is also impressed thereon by generator 29 and consequently frequencies $N+n$ and $N-n$ appear in the output circuit of the modulator. At the same time a frequency $N_1$ is impressed on the modulator 28 from oscillation circuit 27 while a frequency $n$ is impressed thereon from the generator 29, so that frequencies $N_1+n$ and $N_1-n$ appear in the output circuit of modulator 28. These several frequencies are impressed upon oscillation circuit 36 through transformers 34 and 35 and if, as in Fig. 1, $N-n$ is equal to $N_1+n$ and oscillation circuit 36 is tuned to this frequency, frequencies $N+n$ and $N_1-n$ are suppressed and only frequency $N-n=N_1+n$ is impressed on detector 37. As the circuits are adjusted so that oscillations of frequency $N-n$ and $N_1+n$ are impressed upon oscillation circuit 36 in opposite phase relation and with equal amplitude, no effect is produced upon detector 37 or receiving instrument 38. If, however, signals of frequency $N$ are impressed upon the antenna system, only branch 21 resonates and oscillations of frequency $N+n$ and $N-n$ are impressed on oscillation circuit 36, the former being suppressed and the latter acting through the detector 37 to produce a signal in receiving instrument 38.

A still further modification is illustrated in Fig. 3 in which an antenna 39 is provided with two branches 40 and 41 resonant to frequencies $N$ and $N_1$ respectively, branch 40 being coupled through transformer 42 to oscillation circuit 43 tuned to frequency $N$, and branch 41 being coupled through transformer 44 to oscillation circuit 45 having a natural frequency $N_1$. Circuit 43 is connected to the input side of an amplifier 46 whose output circuit is coupled through transformer 47 to the input circuit 48 of a modulator 49 while circuit 45 is connected to the input side of an amplifier 50 whose output circuit is coupled through transformer 51 to circuit 48. A generator comprising a vacuum tube 52 having an oscillation circuit 53 has its circuit arranged in a well known manner so as to generate oscillations of frequency $n$ in the oscillating circuit 53 which is coupled through transformer 54 to circuit 48. Frequencies N, $N_1$ and $n$ being impressed upon this circuit, it may be shown that frequencies $N+n$, $N-n$, $N_1+n$ and $N_1-n$ will appear in the output circuit of modulator 49, said circuit being coupled through transformer 55 to oscillation circuit 56 resonant to a frequency $N-n=N_1+n$. The input side of a detector 57 is connected to oscillation circuit 56, and a receiving instrument 58 is included in the output circuit of the detector.

If, now, a static disturbance occurs, branches 40 and 41 resonate at frequencies N and $N_1$ respectively, these frequencies being amplified by amplifiers 46 and 50 and impressed on circuit 48 together with frequency $n$ from generator 52—53, so that frequencies $N+n$, $N-n$, $N_1+n$ and $N_1-n$ appear in the output circuit of modulator 49, the circuits being so adjusted that frequencies $N-n$ and $N_1+n$ will be of the same amplitude and in opposite phase relation. Oscillation circuit 56 suppresses frequencies $N+n$ and $N_1-n$ and as the oscillations of frequency $N-n$ and $N_1+n$ are of the same frequency and amplitude but opposite in sign, these frequencies neutralize each other in oscillation circuit 56 so that no effect is produced on the detector 57 or receiving instrument 58. If, however, a signal of frequency N is impressed on the antenna systems, branch 40 resonates while substantially no effect is produced on branch 41. Frequency N is therefore amplified by amplifier 46 and impressed on circuit 48 together with frequency $n$ from the generator 52—53, so that frequencies $N+n$ and $N-n$ appear in the output circuit of the modulator 49, the former being suppressed by oscillation circuit 56, and the latter being impressed on the detector 57 to produce a signal in the receiving instrument 58.

It will be understood of course that the double antenna arrangement of Fig. 1 and the antenna with two branches and a common ground connection as in Fig. 2, as well as the antenna with two grounded branches as in Fig. 3 are interchangeable in the several figures. Many other changes and modifications will readily suggest themselves and it will therefore be understood that my invention is not limited to the specific arrangements herein set forth, but is capable of numerous other embodiments within the scope of the appended claims.

What is claimed is:

1. In a receiving system, a receiving circuit resonant to reception frequency, an auxiliary circuit resonant to another frequency, means to transform the radio frequency oscillations of one of said circuits to a different frequency, means to change the oscillations of both circuits to the same amplitude and decrement and a receiving apparatus so connected with respect to said circuits that the said oscillations from said circuits will be impressed thereon in opposite phase relation.

2. In a receiving system, a circuit resonant to reception frequency, a second circuit resonant to a different frequency, means to transform the radio frequency oscillations of both circuits to the same frequency, means to change the oscillations of both circuits to the same amplitude and decrement, and a receiving apparatus so associated with said circuits that the said oscillations from said circuits will be impressed thereon in opposite phase relation.

3. In a receiving system, a circuit resonant to reception frequency, a circuit resonant to another frequency, means to transform the oscillations of each circuit to a plurality of different frequencies, means to change the oscillations of both circuits to the same amplitude and decrement, means to suppress all such transformed frequencies except one, a receiving apparatus, and means to impress the unsuppressed frequency upon the receiving apparatus.

4. In a receiving system, a circuit resonant to reception frequency, a circuit resonant to another frequency, means to transform the oscillations of each circuit to a plurality of sets of oscillations of different frequency, the frequency of one set of transformed oscillations of each circuit being the same, means to change these oscillations to the same amplitude and decrement, and means to suppress oscillations of all frequencies except one.

5. In a receiving system, a circuit resonant to reception frequency, a second circuit resonant to another frequency, an independent source of variations of a third frequency, a modulating apparatus, means whereby oscillations from both said circuits are impressed upon the modulating apparatus simultaneously with said variations from said independent source, whereby the oscillations of both said circuits are transformed to the same frequency.

6. In a receiving system, a circuit resonant to reception frequency, a second circuit resonant to another frequency, an independent source of variations of a third frequency, a modulating apparatus, means whereby oscillations from both said circuits are impressed upon the modulating apparatus simultaneously with said variations from said independent source, whereby the oscillations of both said circuits are transformed to a plurality of sets of oscillations of different frequency, and means for suppressing all of said transformed frequencies except one.

7. In a receiving system, a receiving circuit resonant to reception frequency, a second circuit resonant to another frequency, an independent source of variations of a third frequency, a modulating apparatus of the vacuum tube type, and means for impressing the oscillations from both said circuits upon the modulating apparatus simultaneously with the said variations from said independent source, whereby the oscillations of both said circuits are transformed to the same frequency.

8. In a receiving system, a receiving circuit resonant to reception frequency, a second circuit resonant to another frequency, an independent source of variations of a third frequency, means for associating each of said circuits with said independent source of variations, and means to prevent the oscillations in each of said circuits from reacting upon the source of the third frequency, whereby the source of the third frequency is protected from disturbance by oscillations in each of said circuits.

In testimony whereof, I have signed my name to this specification in the presence of two subscribing witnesses, this seventeenth day of October, 1916.

LLOYD ESPENSCHIED.

Witnesses:
RALPH W. WOLF,
ALFRED KAUFMANN.